United States Patent
Ju et al.

(10) Patent No.: US 9,082,403 B2
(45) Date of Patent: Jul. 14, 2015

(54) SPOKEN UTTERANCE CLASSIFICATION TRAINING FOR A SPEECH RECOGNITION SYSTEM

(75) Inventors: Yun-Cheng Ju, Bellevue, WA (US); James Garnet Droppo, III, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 13/326,659

(22) Filed: Dec. 15, 2011

(65) Prior Publication Data
US 2013/0159000 A1 Jun. 20, 2013

(51) Int. Cl.
G10L 15/00 (2013.01)
G10L 15/18 (2013.01)

(52) U.S. Cl.
CPC .................................. G10L 15/1822 (2013.01)

(58) Field of Classification Search
CPC ...... G10L 15/063; G10L 15/065; G10L 15/22
USPC .................................................. 704/243–245
See application file for complete search history.

(56) References Cited

U.S. PATENT DOCUMENTS

| | | | |
|---|---|---|---|
| 5,721,938 A | 2/1998 | Stuckey | |
| 7,392,185 B2 | 6/2008 | Bennett | |
| 7,634,406 B2* | 12/2009 | Li et al. | 704/244 |
| 7,643,985 B2* | 1/2010 | Horvitz | 704/2 |
| 7,660,715 B1* | 2/2010 | Thambiratnam | 704/244 |
| 7,957,968 B2* | 6/2011 | Gupta et al. | 704/243 |
| 8,019,602 B2* | 9/2011 | Yu et al. | 704/231 |
| 8,438,027 B2* | 5/2013 | Teranishi et al. | 704/243 |
| 8,606,575 B1* | 12/2013 | Witt-ehsani | 704/235 |
| 2002/0128837 A1 | 9/2002 | Morin | |
| 2003/0117365 A1 | 6/2003 | Shteyn | |
| 2004/0162724 A1 | 8/2004 | Hill et al. | |
| 2005/0049865 A1 | 3/2005 | Yaxin et al. | |
| 2006/0116876 A1* | 6/2006 | Marcus | 704/231 |
| 2006/0129397 A1* | 6/2006 | Li et al. | 704/245 |
| 2008/0177530 A1 | 7/2008 | Cross et al. | |

(Continued)

OTHER PUBLICATIONS

Albalate, et al., "Extraction of Similar Terms for Unsupervised Utterance Categorisation in Technical Support Automated Agents", Retrieved at <<http://ieeexplore.ieee.org/stamp/stamp.jsp?tp=&arnumber=4449934>>, In Proceedings of 3rd IET International Conference on Intelligent Environments, Sep. 24-25, 2007, pp. 205-208.

(Continued)

*Primary Examiner* — Douglas Godbold
(74) *Attorney, Agent, or Firm* — Sandy Swain; Judy Yee; Micky Minhas (57) ABSTRACT

The subject disclosure is directed towards training a classifier for spoken utterances without relying on human-assistance. The spoken utterances may be related to a voice menu program for which a speech comprehension component interprets the spoken utterances into voice menu options. The speech comprehension component provides confirmations to some of the spoken utterances in order to accurately assign a semantic label. For each spoken utterance with a denied confirmation, the speech comprehension component automatically generates a pseudo-semantic label that is consistent with the denied confirmation and selected from a set of potential semantic labels and updates a classification model associated with the classifier using the pseudo-semantic label.

20 Claims, 6 Drawing Sheets

(56) References Cited

U.S. PATENT DOCUMENTS

| | | | |
|---|---|---|---|
| 2008/0243499 A1* | 10/2008 | Poi | 704/231 |
| 2009/0006345 A1 | 1/2009 | Platt et al. | |
| 2009/0063145 A1 | 3/2009 | Hakkani-Tur et al. | |
| 2009/0098920 A1* | 4/2009 | Toompere | 463/16 |
| 2009/0119103 A1* | 5/2009 | Gerl et al. | 704/243 |
| 2009/0171662 A1 | 7/2009 | Huang et al. | |
| 2009/0198493 A1 | 8/2009 | Hakkani-Tur et al. | |
| 2010/0023331 A1 | 1/2010 | Duta et al. | |
| 2010/0235165 A1 | 9/2010 | Todhunter et al. | |
| 2011/0077942 A1* | 3/2011 | Ljolje et al. | 704/244 |
| 2011/0307252 A1 | 12/2011 | Ju et al. | |

OTHER PUBLICATIONS

Alshawi, Hiyan, "Effective Utterance Classification with Unsupervised Phonotactic Models", Retrieved at <<http://acl.ldc.upenn.edu/N/N03/N03-1001.pdf>>, In Proceedings of the 2003 Conference of the North American Chapter of the Association for Computational Linguistics on Human Language, May-Jun., 2003, pp. 1-7.

Kuo, et al., "Discriminative Training of Natural Language Call Routers", Retrieved at <<http://ieeexplore.ieee.org/stamp/stamp.jsp?tp=&arnumber=1179375>>, IEEE Transactions on Speech and Audio Processing, vol. 11, No. 1, Jan. 2003, pp. 24-35.

Wang, et al., "Speech Utterance Classification Model Training Without Manual Transcriptions", Retrieved at <<http://groups.csail.mit.edu/sls/archives/root/publications/2006/Iee_icassp06.pdf>>, IEEE ICASSP, Toulouse, France, 2006, 4 pages.

Suendermann, et al., "From Rule-Based to Statistical Grammars: Continuous Improvement of Large-Scale Spoken Dialog Systems", Retrieved at <<http://suendermann.com/su/pdf/icassp2009.pdf>>, IEEE ICASSP, 2009, 4 pages.

Berger, et al., "A Maximum Entropy Approach to Natural Language Processing", Retrieved at <<htt, p://www.daviszhou.net/research/wsd/Berger1996.pdf>>, Computational Linguistics, vol. 22, No. 1, 1996, 36 pages.

Chu-Carroll, et al., "Vector-Based Natural Language Call Routing", Retrieved at <<http://acl.ldc.upenn.edu/J/J99/J99-3003.pdf>>, Computational Linguistics, vol. 25, No. 3, 28 pages, 1999.

Xiao, et al., "Information Retrieval Methods for Automatic Speech Recognition", Retrieved at <<http://research.microsoft.com/pubs/118811/Droppo-icassp2010.pdf>>, Proceedings of IEEE ICASSP, 2010, pp. 5550-5553.

Salton, et al., "Term-Weighting Approaches in Automatic Text Retrieval", Retrieved at <<http://citeseer.ist.psu.edu/viewdoc/download;jsessionid=C57DD1A2DE944530016CB8DD1D8E-083C?doi=10.1.1.101.9086&rep=rep1&type=pdf>>, Information Processing & Management, vol. 24, No. 5, 1988, pp. 513-523.

"Ford Drive One", Retrieved at <<http://www.ford.com/technology/sync/>>, Retrieved date: Aug. 26, 2011, 21 pages.

Ali, et al., "K-Means Clustering to Improve the Accuracy of Decision Tree Response Classification", Retrieved at <<http://scialert.net/qredirect.php?doi=itj.2009.1256.1262&linkid=pdf>>, Information Technology Journal 8 (8), Jan. 1, 2009, pp. 1256-1262.

Albalate, et al., "Machine Learning for Categorisation of Speech Utterances", Retrieved at <<http://suendermann.com/su/pdf/wiley2009.pdf>>, In Mathematical Analysis of Evolution, Information, and Complexity, May 2009, pp. 3-28.

Bolanos, et al., "Multi-Scale Personalization for Voice Search Applications", Retrieved at <<http://www.aclweb.org/anthology/N/N09/N09-2026.pdf>>, NAACL HLT, 2009, Short Papers, Boulder, Colorado, Jun. 2009, Association for Computational Linguistics, pp. 101-104.

Tackstrom, Oscar, "Semi-Supervised Transductive Speaker Identification", Retrieved at <<http://soda.swedish-ict.se/3737/1/ltc-100-tackstrom.pdf, 4th Language & Technology Conference, Nov. 6-8, 2009, 5 pages.

Saraclar, et al., "Pronunciation Modeling by Sharing Gaussian Densities Across Phonetic Models", Retrieved at <<http://www.busim.ee.boun.edu.tr/~murat/publications/eurospeech99.pdf>>, Computer Speech & Language, vol. 14, No. 2, Apr. 2000, 4 pages.

* cited by examiner

SPOKEN UTTERANCE CLASSIFICATION TRAINING FOR A SPEECH RECOGNITION SYSTEM

BACKGROUND

To recognize and understand the intention of spoken utterances (e.g., voice menu commands by users of telephony applications), speech recognition systems typically use various spoken language comprehension techniques. Some techniques provide a specific list of sentences/phrases for which the telephony application listens. When a caller speaks an utterance, a matching sentence/phrase is selected based on weighted parameters and the like, or the caller is asked to repeat the utterance if no suitable matching sentence/phrase is found.

Data driven methods (e.g., utterance classification) are being used to continuously improve the performance of the speech recognition systems over time. Spoken (i.e., speech) utterance classification techniques, for example, are applied to a variety of spoken language comprehension tasks, including call routing, GPS voice-navigation, vehicle/device voice-control (i.e., hands-free), dialog systems, and command and control. The spoken utterance classification has been used recently to classify natural spoken responses to open-ended prompts like "How may I direct your call?", "Where would you like to go?" and/or the like.

However, techniques that implement spoken utterance classification technology include costly steps, namely manual transcription and semantic labeling of the spoken utterances into speech data and annotated training data, respectively, which require human supervision. Because speech recognition system traffic is generally much higher than a number of affordable transcribed or labeled spoken utterances, a significant number of the spoken utterances remain unlabeled. It is impractical for humans to transcribe and/or semantically label a significant amount of the training data in order to marginally improve semantic classification performance for the telephony application.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards spoken utterance classification training for a speech recognition system. Techniques for implementing the spoken utterance classification are embodied within a component known as a classifier (i.e., a semantic classifier). In one aspect, classification model training of for the classifier may be, at least in part, automated. A speech comprehension component may use pseudo-semantic labels to train the classification model associated with the classifier without human supervision. In another aspect, the speech comprehension component may use a combination of the pseudo-semantic labels and human annotated labels for the spoken utterances to train the classification model.

The speech comprehension component is configured to process a classification result and assign a pseudo-semantic label to each spoken utterance having an unaccepted or "denied" confirmation. The pseudo-semantic labels are consistent with the denied confirmations and selected from a set of potential semantic labels. In one aspect, the pseudo-semantic label corresponds to a current best estimate (e.g., an a priori inference) of a correct semantic label that has not been denied by the speech recognition system user.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing a classification model for spoken utterances that is trained, at least in part, without human assistance. In one implementation, the classifier may be deployed by a speech recognition system for a particular task, such as a call routing, hands-free control, GPS vehicle navigation and/or the like. As described herein, the speech recognition system may include a speech comprehension component that uses the classifier to interpret a spoken utterance by a user and determine a desired command that matches (e.g., substantially or best matches) the spoken utterance. For example, the speech comprehension component may receive a voice-based service request in which a caller utters speech comprising one or more words and routes the voice call to an appropriate destination, which may be a voice menu option that maps to a semantic label assigned to the one or more words. It is appreciated that other example uses of the speech comprehension component are envisioned by the embodiments within the present disclosure.

According to one implementation, the speech recognition system may include multiple phases having independently trained components. In one phase, an automatic speech recognizer (ASR) component returns a most likely textual equivalent of an observed acoustic signal. In a later phase, the classifier transforms the resulting textual equivalent into the most likely semantic meaning/class. Utilizing one or more user confirmations and the resulting textual equivalent, the speech comprehension component enhances classification model training without exclusively using human assistance during transcription and labeling.

In one implementation, the speech comprehension component progressively trains the classification model associated with the classifier using a portion of the spoken utterances and corresponding semantic labels or pseudo-semantic labels. The speech comprehension component partitions the spoken utterances into groupings of spoken utterances having unsettled denied confirmations in addition to a current training set comprising spoken utterances having accepted confirmations and other settled spoken utterances, such as one having a denied confirmation with a pseudo-semantic label that is a part of the current training set (i.e., resolved). Hence, an example spoken utterance having an unsettled denied confirmation is not yet incorporated into the current training set because an assigned pseudo-semantic label is not resolved and subject to change. For each grouping, the speech comprehension component determines pseudo-semantic labels for the spoken utterances having the unsettled denied confirmations and trains the classification model with a combination of the current training set and the spoken utterances having the unsettled denied confirmations.

In one implementation, the speech comprehension component determines a number of discrepancies between the semantic labels produced by the classifier and the combination of the current training data and the spoken utterances having the unsettled denied confirmations. The speech comprehension component may incorporate the grouping having a smallest number of discrepancies into the current training data, which is to train the classification model associated with the classifier. After training, the classifier produces updated classifications results for the spoken utterances having the denied confirmations. If the speech comprehension component modifies the pseudo-semantic labels based on the updated classification results, the speech comprehension component selects another grouping having a smallest number of discrepancies to be incorporated into the current training set.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and speech recognition technology in general.

Figure 1:
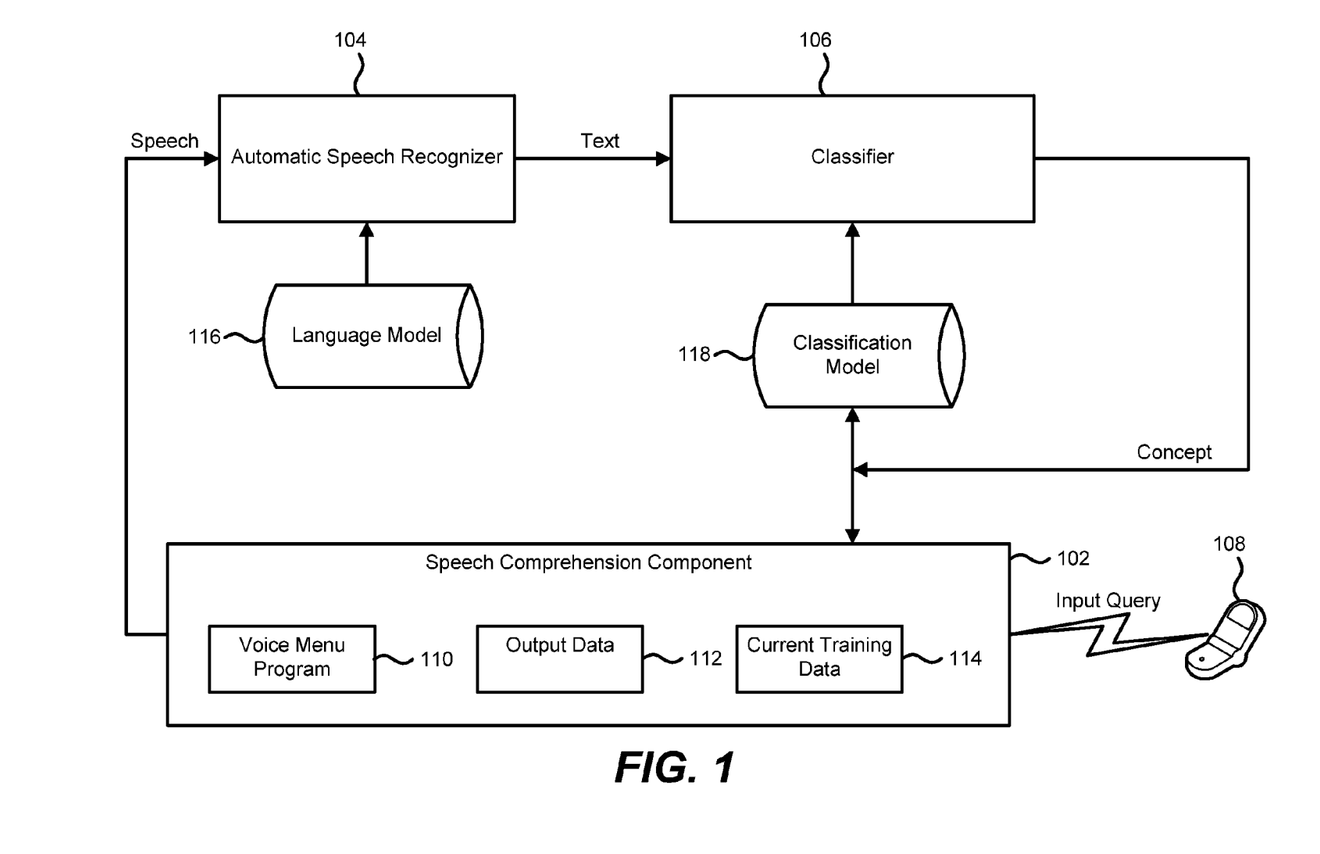
FIG. 1 is a block diagram illustrating an example system for classifying spoken utterances without human-assisted training according to one example implementation.

FIG. 1 is a block diagram illustrating an example system for classifying spoken utterances without relying on human-assisted training according to one example implementation. Various components of the example (speech recognition) system may include a speech comprehension component 102, an automatic speech recognizer 104 and a classifier 106.

When a speaking entity (e.g., a user of the speech recognition system, such as a caller to a call routing system or a vehicle driver/passenger for a voice-driven system) submits an input query through a microphone 108, the speech comprehension component 102 responds with potentially pertinent information as described herein. It is appreciated that the present disclosure, while describing the input query as (phone) caller input, may also include input queries submitted through an alternative input device, such as a microphone for a computing device running a Voice Over Internet Protocol (VOIP) program, a voice controlled device (e.g., an Automated Teller Machine (ATM) or an vehicle (e.g., automobile) voice driven system) or any other voice controlled computer program. In any of these implementations, spoken utterances may be captured in the form of speech data by the speech comprehension component 102, automatically transcribed into a textual equivalent by the automatic speech recognizer 104 and assigned a meaning or concept by the classifier 106.

According to one example implementation, the speech comprehension component 102 includes a voice menu program 110 that, if matched to a meaning or concept, directs the user to desired content and/or capability. A caller, for example, may utter language (i.e., words) purporting to represent one or more voice menu commands/options if known beforehand. The caller, as another example, may utter speech in response to an open-ended, general question to which the speech comprehension component 102 may have an answer. The caller, in yet another example, may utter side speech or nonsensical words. Based on a reasonable interpretation of any of the caller's verbal communications, the speech comprehension component 102 may reject the voice call entirely or navigate the caller through a voice menu hierarchy in order to identify an information service of interest, such as a weather forecast, current traffic information, recent news stories and/or the like, and/or an appropriate person or group (e.g., a department) to assist the caller.

After each spoken utterance, the speech comprehension component 102 records an estimation of a concept being conveyed, which may be semantic label generated by the classifier 106, within output data 112 according to one implementation. Such a semantic label may be selected from a set of potential concepts that may be germane to the voice menu program 110. It is appreciated that the set of potential concepts may further include mistakes or common errors made by callers in order to differentiate unclear speech from erroneous speech and prevent false positive labeling. As an example, the output data 112 may include a permutation of semantic labels assigned to spoken utterances and chosen from the following set of example menu options: "Business Search", "Driving Directions", "Traffic", "Weather", "Sports", "Favorites", "News", "Next Turn", "Tell Me my Choices", "Main Menu", "Good bye" and/or the like. Furthermore, a portion of the output data 112 may be used as current training data 114.

Because a non-trivial percentage of the spoken utterances may include noise, side speech, nonsensical speech, erroneous speech (e.g., a dialog in which the caller denies a confirmation that should be accepted or utters a wrong phrase by accident) and/or irrelevant speech (e.g., "Hello", "Stop fighting with each other" and/or the like), these spoken utterances may be assigned a "Reject" semantic label. In one implementation, the speech comprehension component 102 may provide confirmations for some of the rejected spoken utterances in order to induce denied confirmations, which produces additional pseudo-semantic labels for utterance classification training. For example, when the caller utters "Honey, can you pick up some milk!" and the classifier 106 assigns a reject semantic label, the speech comprehension component 102 queries the caller with confirmation "You said traffic, correct?". When the caller responds with a "no", the speech comprehension component 102 assigns the spoken utterance with a pseudo-semantic label of "Not traffic". Such a training data collection strategy may be employed naively (e.g., for less than or equal to one percent (1%) of the rejected spoken utterances) or adaptively based on a likelihood of the classifier 106 to assign a reject semantic label according to various implementations.

An example adaptive approach may determine when to ask for a confirmation using a confidence score that is proportional to the rejected spoken utterance percentage in a sample, such as ten (10%) percent if the rejected spoken utterance percentage is less than or equal to ten (10%) percent or, alternatively, five (5%) percent if the rejected spoken utterance percentage is greater than ten (10%) percent. In another implementation, the speech comprehension component 102 ignores one or more of the rejected spoken utterances.

The automatic speech recognizer 104 may employ numerous retrieval-based methods to convert speech into text representing the reasonable interpretation of a spoken utterance. For example, the automatic speech recognizer 104 may use a language model 116 (e.g., a statistical language model) to covert the spoken utterance to candidate words/phrases. In one implementation, a classification model 118 includes as a routing table to map the spoken utterances into a fixed set of semantic concepts (i.e., labels). The classification model may be used to verify the accuracy of speech to text string conversion. By evaluating each text string against the classification model 118, the classifier 106 may be able to recover from instances of speech misrecognition by the automatic speech recognizer 104. The classifier 106 may include any appropriate semantic classifier, such as maximum entropy or a vector space model based classifiers using n-gram (e.g., bigram) word features. The following example discriminant function controls how elements of a routing matrix R map terms of an utterance vector x into a target semantic label/class (i.e., voice menu option) j.

$$g_j(x, R) = \langle x, r_j \rangle = \sum_k x_k r_{jk}$$

The routing matrix may be initialized using a TF-IDF formula and discriminatively trained based on Minimum Classification Error (MCE) criterion to guarantee a minimized Classification Error Rate (CER). The transpose of the acoustic unit-text string matrix is the routing matrix R with row $r_j$ as a menu option text string.

In one implementation, the output data 112 includes a dialog activity log for each call session, which stores audio data and text data of one or more spoken utterances, classification results, a dialog stage, system prompt, caller responses (e.g., a confirmation acceptance or denial) and/or recognition context. The speech comprehension component 102 may use various feedback during a dialog with the caller, such as a confirmation inquiry (e.g., "I think you said weather, is that right?"), at one or more major branch points to guarantee the dialog is moving in the right direction. If, for example, the caller answers the confirmation inquiry with a clear "yes", then the caller's accepted confirmation semantically labels the utterance; on the other hand, the caller's denied confirmation, via a clear "no" answer, may be used to exclude the underlying confirmation from a set of potential semantic labels and/or automatically generate another semantic label, which may be known as a pseudo-semantic label, that is consistent with the denied confirmation and selected from the set of potential semantic labels as described herein.

The automatically generated pseudo-semantic label for the denied confirmation may enhance the training of the classification model 118. Because the underlying confirmation (query) is known to be not correct, the speech comprehension component 102 narrows the set of potential semantic labels and assigns a pseudo-semantic label that is a next closest related concept (e.g., menu option), according to the classification model 118, which was not denied by the caller. In another example, the speech comprehension component 102 may assign a pseudo-semantic label to a spoken utterance having a denied confirmation in which the caller did not previously utter a valid menu option, but the classification model 118 failed to reject. These example pseudo semantic labels are used to train the classification model 118 with spoken utterances that are not to be accepted or confirmed, but are to be rejected (i.e., a "reject" semantic label). The speech comprehension component 102 may produce accurate pseudo-semantic labels for denied confirmations using any number of techniques that periodically (e.g., iteratively) update previous pseudo-semantic labels based on recent classification results. The updated pseudo-semantic labels may be used to improve the accuracy of the classification model 118 for a next spoken utterance.

In one implementation, using a baseline configuration (e.g., a set of accepted confirmations and other settled semantic labels of spoken utterances) of the classification model 118, the classifier 106 may generate semantic labels for spoken utterances within the output data 112. Based on these labels, the speech comprehension component 102 may automatically assign a pseudo-semantic label to each spoken utterance having at least one denied confirmation. As described herein, the pseudo-semantic label for a particular spoken utterance may be a concept that is consistent with one or more associated denied confirmations and selected from one or more semantic labels produced by the classifier 106. Along with the semantic labels for the baseline configuration, the speech comprehension component 102 stores the pseudo-semantic labels for the denied confirmations as the current training data 114. After each iteration, the speech comprehension component 102 updates the pseudo-semantic labels of the denied confirmations and repeats the pseudo labeling assignment until an accurate set of such labels is achieved.

Table 1 below represents three example iterations of such pseudo semantic labeling performed by the classifier 106 and the speech comprehension component 102.

TABLE 1

| Semantic Label #1 | Weather | Weather | Traffic |
| Semantic Label #2 | Reject | Traffic | Weather |
| Pseudo Semantic Label | Reject | Traffic | Traffic |

Table 1 illustrates that during the classification model 118 training, the classifier 106 may produce a first semantic label "Weather" and a second semantic label "Reject" for a particular denied confirmation, whereby the classifier 106 considers "Weather" to be a better label than "Reject". Then, the speech comprehension component 102 may select the "Reject" semantic label as the pseudo semantic label because the caller denied that the spoken utterance is "Weather" with a clear "No" answer to a confirmation query but, implicitly, did not deny that the spoken utterance is to be rejected. At the first iteration, hence, the "Reject" semantic label is a more accurate label than the "Weather" semantic label. After retraining the classification model 118 with the "Reject" pseudo label for the spoken utterance, the classifier 106 produces a "Weather" semantic label and a "Traffic" semantic label for the same spoken utterance at a next (training) iteration. The speech comprehension component 102 selects "Traffic" as the pseudo label for this iteration because "Traffic" represents a more accurate label than "Weather", which was denied by the caller. After updating the classification model 118, the classifier 106 produces a "Traffic" semantic label and a "Weather" semantic label as a first and second choice, respectively. The classification model 118 is now trained to provide a better initial classification result and may be ready for redeployment.

In another implementation, the speech comprehension component 102 iteratively trains the classification model 118 associated with the classifier 106 by progressively incorporating spoken utterances having denied confirmations into the current training data 114. As described herein, the speech comprehension component 102 uses the current training data 114 to train the classification model 118 and configure the classifier 106. According to such an implementation, the speech comprehension component 102 may identify a baseline configuration for the classifier 106 that includes, for example, a set of accepted confirmations and other spoken utterances having settled semantic labels. The baseline configuration may be stored in the current training data 114 and used to initially train the classifier 106. The speech comprehension component 102 instructs the classifier 106 to produce a current semantic label for each spoken utterance within the output data 112. As described herein, the current semantic label may be a classification result having a lowest semantic classification error rate (i.e., a best classification result) based on the classification model 118.

During each training iteration, the speech comprehension component 102 assigns and/or updates pseudo-semantic labels for the spoken utterances with denied confirmations based on the current corresponding semantic labels provided by the classifier 106. The speech comprehension component 102 partitions (e.g., randomly) these call utterances into groupings of unsettled denied confirmations and/or a set of settled denied confirmations. A settled denied confirmation may include a spoken utterance and an associated pseudo-semantic label that is incorporated into the current training data 114.

For each grouping of unsettled denied confirmations, the speech comprehension component 102 forms a candidate training configuration by combining these unsettled denied confirmations and associated new/updated pseudo labels with the current training data 114 and evaluates the candidate training configuration against a set of current semantic labels for the spoken utterances comprising pseudo-semantic labels of all denied confirmations and accurate semantic labels of the baseline configuration. For example, the speech comprehension component 102 uses the candidate training configuration to train the classification model 118, which produces a second set of semantic labels for the spoken utterances. The speech comprehension component 102 may compare the set of the current semantic labels and the second set of the semantic labels to determine discrepancy indicia (e.g., a number of discrepancies). A discrepancy may include an instance in which the classifier 106 disagrees with an accepted confirmation or a correctly labeled utterance or produces a confirmation that has been denied. The discrepancy indicia functions essentially as a heuristic to gauge semantic classification accuracy the classifier 106 and potential performance improvement associated with the candidate training configuration.

In one implementation, after evaluating the groupings, the speech comprehension component selects a candidate training configuration having a smallest number of discrepancies and resolves pseudo-semantic labels for unsettled denied confirmations within that candidate training configuration. Each settled pseudo label may remain fixed during subsequent training iterations. In one implementation, the speech comprehension component 102 repeats the training of the classifier 106 for a next iteration unless there are no more unsettled denied confirmations within the output data 112. The speech comprehension component 102 may partition a set of remaining unsettled denied confirmations into new groupings or proceed to evaluate the remaining groupings.

Figure 2:
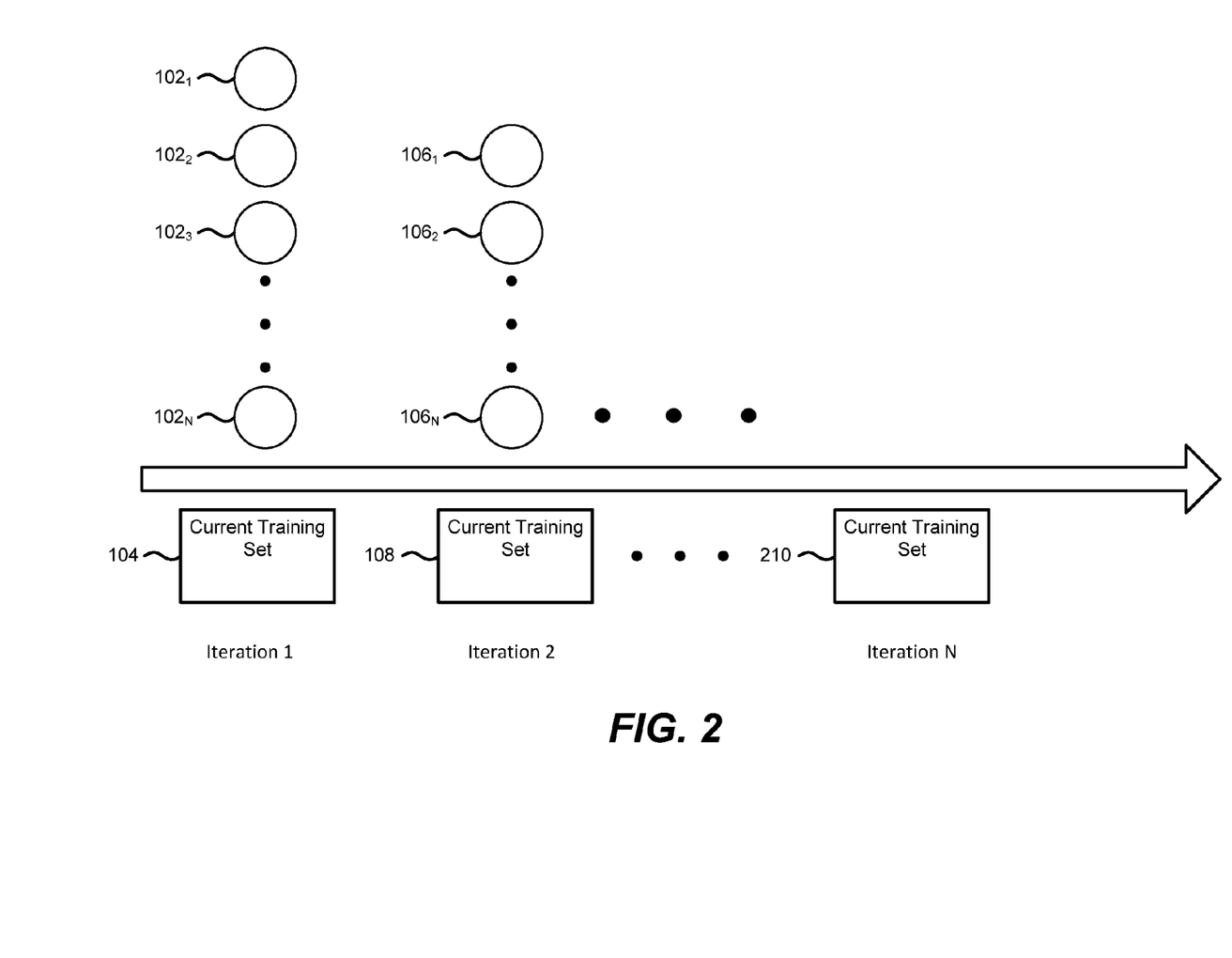
FIG. 2 illustrates classification model training using spoken utterances for a voice menu program according to one example implementation.

FIG. 2 illustrates classification model training using spoken utterances for a voice menu program according to one example implementation. Initially, the spoken utterances may be partitioned into groupings 202 in which each grouping comprises one or more spoken utterances having a denied confirmation. In one implementation, each spoken utterance may be associated with an unsettled pseudo-semantic label that is not yet incorporated into current training data 204, which initially includes confirmed/settled spoken utterances and/or manually labeled spoken utterances. After a first training iteration (illustrated as "Iteration 1"), the speech comprehension component 102 selects one of the groupings 202 to settle. In one implementation, the speech comprehension component 102 identifies the grouping 202 that, if incorporated into the current training data 204, provides a highest potential improvement in semantic classification. Alternatively, the speech comprehension component 102 selects one of the groupings 202 that does not cause the classifier 106 to be less accurate (e.g., if the other groupings 202 cannot improve the classifier 106).

At a next training iteration, remaining spoken utterances having denied confirmations and unsettled pseudo-semantic labels may be re-partitioned into groupings 206. Similarly, one of the groupings 206 is selected to be incorporated into current training set 208. As illustrated, the training iterations repeat until there are no more unsettled pseudo-semantic labels to incorporate into current training set 210 (illustrated at "Iteration N"). As an alternative, the training iterations proceed until an iteration where none of the groupings enhances the classification model associated 118 or, at the very least, does not diminish the performance of the classifier 106. At such an iteration, the current training set 210 is to remain fixed. In another alternative implementation, a next training iteration is performed if the speech comprehension component 102 modifies a pseudo-semantic label assignment from a previous training iteration after recalculating pseudo-semantic labels for all spoken utterances having denied confirmations with unsettled pseudo-semantic labels.

Figure 3:
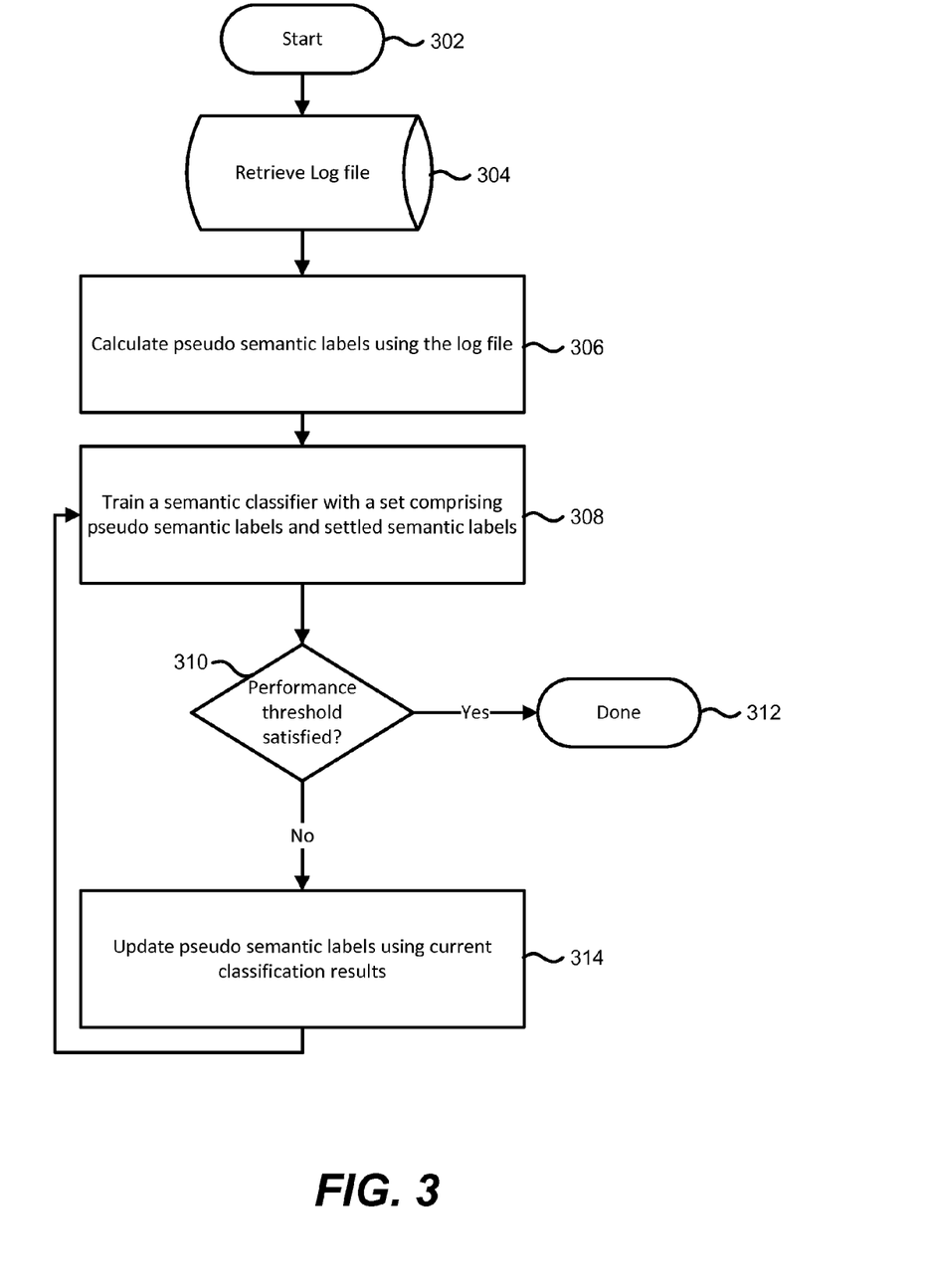
FIG. 3 is a flow diagram illustrating example steps for training a classification model associated with the a semantic classifier using pseudo-semantic labels for spoken utterances with denied confirmations according to one example implementation.

FIG. 3 is a flow diagram illustrating example steps for training a classification model associated with a semantic classifier using pseudo-semantic labels for spoken utterances with denied confirmations according to one example implementation. The example steps commence at step 302 and proceed to step 304 at which a log file is retrieved from a deployed system. In one implementation, the log file may be the output data 112 generated by the speech comprehension component 102 for the example system illustrated in FIG. 1. As described herein, the deployed system may be used for alternative purposes other than call routing, such as any voice activated command/dialog system or other voice menu programs.

Step 306 is directed to calculating pseudo-semantic labels using the log file. In one implementation, the log file stores classification results (e.g., semantic labels) for spoken utterances. The log file may also include accepted/denied confirmations of one or more of the spoken utterances. A pseudo-semantic label is a classification result that best matches text data and/or speech data for a particular spoken utterance and is consistent with one or more associated denied confirmations while satisfying a classification model. A set comprising the pseudo-semantic labels and settled semantic labels (e.g., accepted confirmations, human labeled utterances and/or the like) may be used as training data (e.g., the current training data 114 of FIG. 1) for the semantic classifier (e.g., the classifier 106 of FIG. 1).

Step 308 represents training the semantic classifier with the set comprising the pseudo-semantic labels and the settled semantic labels. After being trained with the training data, the semantic classifier produces current classification results for the spoken utterances. In one implementation, the training data improves an accuracy of the semantic classifier. Step 310 illustrates a determination as to whether the semantic classifier satisfies a performance threshold to be utilized by the deployed system. If the semantic classifier meets or exceeds such a performance threshold, the step 310 proceeds to step 312 and terminates the steps described in FIG. 3. For example, if a current pseudo-semantic label assignment is equal to a previous pseudo-semantic label assignment, the semantic classifier is stable and satisfies the performance threshold.

If the semantic classifier fails to satisfy the performance threshold, the step 310 proceeds to step 314. For example, if the current classification results indicate that a current semantic label disagrees with a corresponding pseudo-semantic label for one or more spoken utterances, the semantic classifier is not stable and does not satisfy the performance threshold. Step 314 is directed to updating the pseudo-semantic labels using the current classification results after which step 314 returns to step 308. In one implementation, if one of the pseudo-semantic labels is modified, the performance threshold is not satisfied and step 308 and step 314 are repeated for another training iteration.

Figure 4:
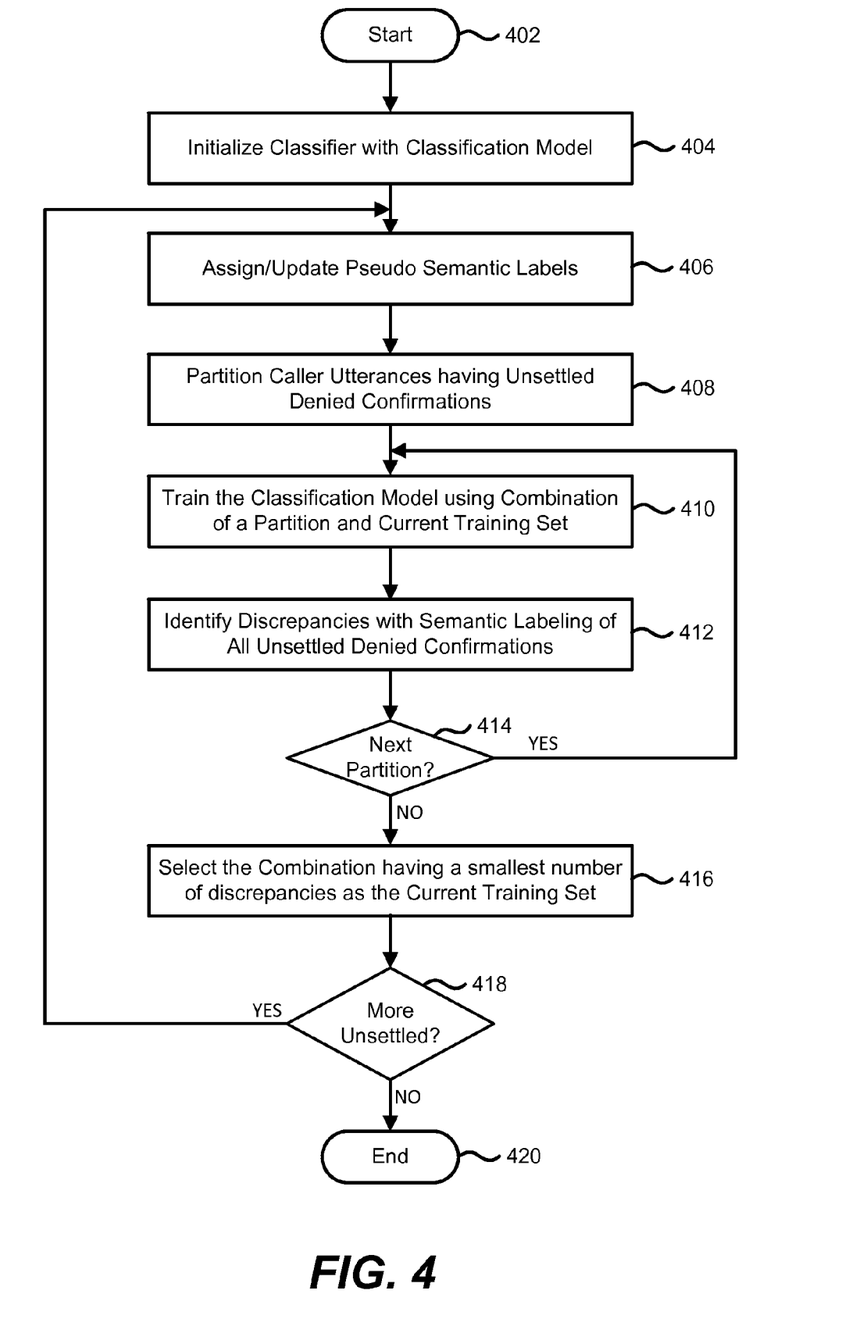
FIG. 4 is a flow diagram illustrating example steps for progressively training a classification model associated with a classifier for a voice menu program according to one example implementation.

FIG. 4 is a flow diagram illustrating example steps for progressively training a classification model associated with a semantic classifier for a voice menu program according to one example implementation. The speech comprehension component 102 performs the example steps that commence at step 402 and proceed to step 404 at which a classification model (e.g., the classification model 118 of FIG. 1) for a semantic classifier (e.g., the classifier 106 of FIG. 1) is initialized with a baseline configuration. In one implementation, the baseline configuration includes semantic labels in the form of accepted confirmations of spoken or spoken utterances and/or other settled semantic labels. Subsequently, the semantic classifier generates a current semantic label assignment for the spoken utterances.

Step 406 is directed to assigning or updating pseudo-semantic labels associated with denied confirmations of the spoken utterances. In one implementation, the speech comprehension component 102 replaces one or more pseudo-semantic labels with more accurate ones based on the current semantic label assignment. For example, the speech comprehension component 102 identifies a classification result that is consistent with the denied confirmation and produced using a classification model. Step 408 refers to partitioning the spoken utterances having unsettled denied confirmations. As described herein, an unsettled denied confirmation corresponds with a pseudo-semantic label that is not accurate enough to train the classification model associated with the semantic classifier.

Step 410 is directed to training the classification model associated with the semantic classifier using a combination of a specific partition or grouping of the unsettled denied confirmations and a current training set of spoken utterances. In one implementation, the speech comprehension component 102 instructs the semantic classifier, which is trained with the specific partition, to generate a semantic labeling for the spoken utterances having unsettled denied confirmations. Step 412 is directed to identifying discrepancies associated with the semantic labeling. In one implementation, the speech comprehension component 102 identifies one or more instances where a semantic label is inconsistent with an accepted confirmation or a denied confirmation. For example, such a semantic label may be a classification result that is not equal to the accepted confirmation or be associated with a confirmation that is denied. Step 414 determines whether there is a next partition to evaluate. If there is a next partition, step 414 returns to step 410. If there are no more partitions to evaluate, step 414 proceeds to step 416.

Step 416 is directed to selecting the combination (i.e., a candidate training configuration) having a smallest number of discrepancies as the current training set. Step 418 determines whether there are more unsettled denied confirmations to incorporate into the current training set. If there are more unsettled denied confirmations, the step 418 returns to step 406. If there are no more unsettled denied confirmations, step 418 proceeds to step 420. Step 420 terminates the example steps described in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
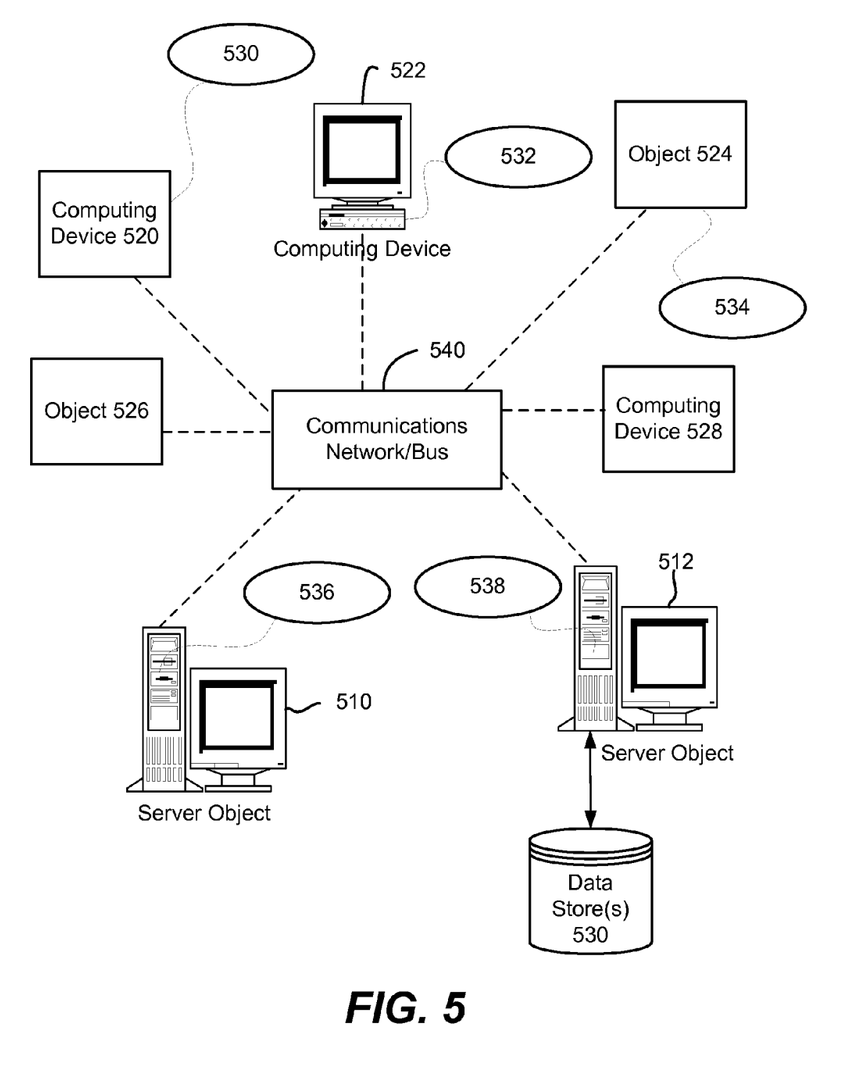
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
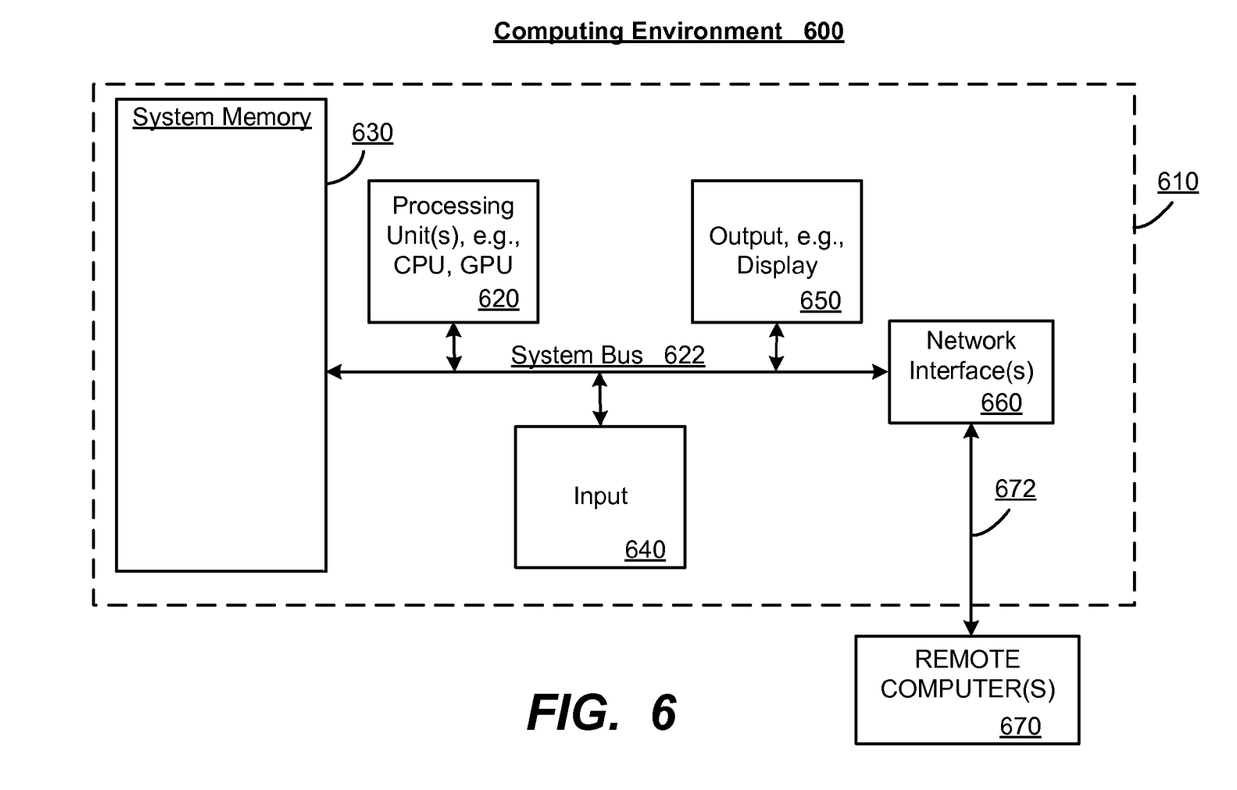
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
  receiving, by a speech recognition system, spoken utterances and associated confirmations;
  processing, by a classifier of the speech recognition system, the spoken utterances and associated confirmations from output data associated with the speech recognition system, including for each spoken utterance having a denied confirmation, assigning a pseudo-semantic label that is a representation of an association between the denied confirmation and a rejected semantic label selected from a set of potential semantic labels, and updating a classification model associated with the classifier using each assigned pseudo-semantic label, wherein the denied confirmation comprises determining a negative response to a confirmation prompt delivered by the speech recognition system.

2. The method of claim 1, wherein assigning the pseudo-semantic label further comprises partitioning the spoken utterances into groupings of spoken utterances having unsettled denied confirmations and a current training set comprising settled spoken utterances, wherein the settled spoken utterances comprise accepted confirmations.

3. The method of claim 2, wherein updating the classification model further comprises for each grouping, determining pseudo-semantic labels for the spoken utterances having the unsettled denied confirmations and training the classification model with a combination of the current training set and the spoken utterances having the unsettled denied confirmations.

4. The method of claim 2, wherein updating the classification model further comprises for each grouping, determining a number of discrepancies between a semantic labeling produced by the classifier and the combination of the current training set and the spoken utterances having the unsettled denied confirmations.

5. The method of claim 4 further comprising:
  selecting a grouping having a smallest number of discrepancies and incorporating the spoken utterances having the unsettled denied confirmations into the current training set.

6. The method of claim 5 further comprising:
  training the classification model with the current training set; and producing classifications results for the spoken utterances having the denied confirmations.

7. The method of claim 6 further comprising:
updating the pseudo-semantic labels based on the classification results; and
selecting another grouping having a smallest number of discrepancies to be incorporated into the current training set.

8. The method of claim 1, wherein updating the classification model further comprises training the classification model with a current training set comprising spoken utterances having accepted confirmations and spoken utterances having settled denied confirmations.

9. The method of claim 1 further comprising:
performing the step of assigning the pseudo-semantic label and the step of updating the classification model for another training iteration.

10. The method of claim 1 further comprising:
repeating the method if a pseudo-semantic label assignment is modified.

11. In a computing environment, a system, comprising:
at least one processor;
a memory coupled to the at least one processor; and
a speech comprehension component implemented on the at least one processor and configured to receive spoken utterances, process the spoken utterances using a classifier, generate output data comprising settled semantic labels for at least a portion of the spoken utterances and one or more confirmations associated with one or more of the spoken utterances, and assign pseudo-semantic labels for at least another portion of the spoken utterances having denied confirmations using the output data generated, the pseudo-semantic labels comprising representations of an association between the denied confirmations and one or more rejected semantic labels, the speech comprehension component further configured to train a classification model associated with the classifier with the pseudo-semantic labels and the settled semantic labels, and to use the classification model to navigate a speaking entity to desired information.

12. The system of claim 11, wherein the speech comprehension component is further configured to automatically generate a pseudo-semantic label for each spoken utterance having a denied confirmation, the pseudo-semantic label being a concept consistent with the denied confirmation, satisfying the classification model, and selected from a set of potential semantic labels, the set of potential semantic labels comprising potential concepts.

13. The system of claim 11, wherein the speech comprehension component is further configured to identify groupings of spoken utterances having unsettled denied confirmations and to generate current training data comprising spoken utterances having accepted confirmations and spoken utterances having settled denied confirmations.

14. The system of claim 13, wherein the speech comprehension component is further configured to determine pseudo-semantic labels for each grouping of spoken utterances having unsettled denied confirmations and to train the classification model with a combination of the current training data and the each grouping.

15. The system of claim 14, wherein the speech comprehension component is further configured to determine a number of discrepancies between updated semantic labels produced by the classifier and a combination of the current training data and at least one of the groupings of the spoken utterances having unsettled denied confirmations.

16. The system of claim 13, wherein the speech comprehension component is further configured to incorporate a grouping having a smallest number of discrepancies between updated semantic labels produced by the classifier and a combination of the current training data and the each grouping into the current training data, to train the classifier with the current training data and to classify the output data used to produce another set of semantic labels for the spoken utterances.

17. The system of claim 16, wherein the speech comprehension component is further configured to select a remaining one of the grouping to be incorporated into the current training data based on discrepancy indicia.

18. A method comprising:
receiving, by at least one processing device, a log file comprising data associated with one or more spoken utterances, system prompt information, and denied confirmations associated with a sub-set of the one or more spoken utterances;
calculating pseudo-semantic labels for each spoken utterance in the sub-set of the one or more spoken utterances, the pseudo-semantic labels comprising a classification result that is consistent with both the data and the denied confirmations, is selected from a set of potential concepts germane to the data and the system prompt information, and represents an association between the denied confirmation and one or more rejected semantic labels;
training a classifier using the calculated pseudo-semantic labels; and
using the trained classifier to process input speech data.

19. The method of claim 18 further comprising:
generating training data comprising spoken utterances having accepted confirmations and spoken utterances having settled denied confirmations; and
training a classification model associated with the classifier with the training data.

20. The method of claim 19 further comprising:
identifying a grouping of spoken utterances having unsettled denied confirmations from the log file;
calculating pseudo-semantic labels for the spoken utterances in the grouping; and
training the classification model with a combination of the training data and the calculated pseudo-semantic labels for the spoken utterances in the grouping.

* * * * *